United States Patent
Kunugi et al.

(10) Patent No.: US 9,762,803 B2
(45) Date of Patent: Sep. 12, 2017

(54) FOCAL POINT ADJUSTMENT DEVICE, CAMERA SYSTEM, AND FOCAL POINT ADJUSTMENT METHOD FOR IMAGING DEVICE

(71) Applicant: Olympus Corporation, Hachioji-shi, Tokyo (JP)

(72) Inventors: Kazumasa Kunugi, Hino (JP); Kazumi Ito, Fuchu (JP); Tetsuo Kikuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/276,143

(22) Filed: Sep. 26, 2016

(65) Prior Publication Data
US 2017/0013199 A1 Jan. 12, 2017

Related U.S. Application Data (63) Continuation of application No. PCT/JP2015/054954, filed on Feb. 23, 2015.

(30) Foreign Application Priority Data

Apr. 10, 2014 (JP) ................................. 2014-081016

(51) Int. Cl.
*H04N 5/232* (2006.01)
*G02B 7/28* (2006.01)
(Continued)

(52) U.S. Cl.
CPC .......... *H04N 5/23287* (2013.01); *G02B 7/14* (2013.01); *G02B 7/28* (2013.01); *G02B 27/646* (2013.01);
(Continued)

(58) Field of Classification Search
CPC .......... H04N 5/23212; H04N 5/23287; H04N 5/2254; H04N 5/23209; H04N 5/23248;
(Continued)

(56) References Cited

U.S. PATENT DOCUMENTS 8,036,521 B2 * 10/2011 Ono ....................... G03B 13/00
396/104
8,743,268 B2 * 6/2014 Kawahara .......... H04N 5/23248
348/208.1

(Continued)

FOREIGN PATENT DOCUMENTS

JP 10-068871 3/1998
JP 2009-075407 4/2009

OTHER PUBLICATIONS

International Search Report corresponding to International Application No. PCT/JP2015/054954.

*Primary Examiner* — Michael Osinski
(74) *Attorney, Agent, or Firm* — John C. Pokotylo; Straub & Pokotylo (57) ABSTRACT

A focal point detection device according to the present invention comprising: an image sensor having an imaging pixel and a focal point detection pixel; a camera-shake preventing section which moves the image sensor in a direction perpendicular to the optical axis of the photographic lens to correct camera shake and also outputs information on the movement of the image sensor; a calculation section to calculate a focal point adjustment signal, based on the output of the focal point detection pixel; a memory to store a correction value for correcting the focal point adjustment signal, depending on the image height position of the focal point detection pixel; and a correction section to correct the focal point adjustment signal, depending on the output of the memory, the information output by the camera-shake preventing section, and the position of the focal point detection pixel.

7 Claims, 7 Drawing Sheets

(51) Int. Cl.
*G02B 27/64* (2006.01)
*G02B 7/14* (2006.01)
*H04N 5/225* (2006.01)
*G02B 7/36* (2006.01)

(52) U.S. Cl.
CPC ......... *H04N 5/2253* (2013.01); *H04N 5/2254* (2013.01); *H04N 5/23212* (2013.01); *G02B 7/36* (2013.01)

(58) Field of Classification Search
CPC .......... H04N 5/23229; H04N 5/23258; H04N 5/23264; G03B 13/36; G03B 17/14; G03B 2205/0007; G03B 5/00; G02B 7/36; G02B 7/34; G02B 7/09; G02B 7/14
See application file for complete search history.

(56) References Cited

U.S. PATENT DOCUMENTS

| | | | | |
|---|---|---|---|---|
| 9,451,147 | B2 * | 9/2016 | Hiasa | H04N 5/23212 |
| 9,451,149 | B2 * | 9/2016 | Hasegawa | H04N 5/23212 |
| 2009/0180770 | A1 * | 7/2009 | Honjo | G03B 5/00 396/55 |
| 2010/0128133 | A1 * | 5/2010 | Lee | H04N 5/23248 348/208.5 |
| 2011/0205403 | A1 * | 8/2011 | Ito | G02B 7/36 348/241 |
| 2011/0273608 | A1 | 11/2011 | Tsukada | |
| 2012/0268613 | A1 | 10/2012 | Nishio | |
| 2012/0281130 | A1 * | 11/2012 | Kudo | G02B 7/287 348/333.08 |
| 2013/0128006 | A1 * | 5/2013 | Horikawa | H04N 13/0203 348/49 |
| 2013/0308933 | A1 * | 11/2013 | Uchiyama | G03B 13/36 396/125 |
| 2014/0071303 | A1 * | 3/2014 | Hasegawa | H04N 5/23212 348/208.11 |
| 2015/0109518 | A1 * | 4/2015 | Ishii | H04N 5/23212 348/353 |
| 2015/0312505 | A1 * | 10/2015 | Sugawara | G02B 7/34 348/294 |
| 2016/0182811 | A1 * | 6/2016 | Ito | H04N 5/23212 348/350 |
| 2016/0205312 | A1 * | 7/2016 | Ito | G03B 13/36 348/345 |
| 2016/0227101 | A1 * | 8/2016 | Iwasaki | H04N 5/23212 |
| 2017/0054894 | A1 * | 2/2017 | Takanashi | H04N 5/23212 |

* cited by examiner

FOCAL POINT ADJUSTMENT DEVICE, CAMERA SYSTEM, AND FOCAL POINT ADJUSTMENT METHOD FOR IMAGING DEVICE

CROSS-REFERENCE TO RELATED APPLICATIONS

This application is a Continuation Application of PCT Application No. PCT/JP2015/054954, filed on Apr. Feb. 23, 2015 and based upon and claiming the benefit of priority from prior Japanese Patent Application No. 2014-081016, filed on Apr. 10, 2014, the entire contents of all of which are incorporated herein by reference.

BACKGROUND OF THE INVENTION

1. Field of the Invention

The present invention relates to a focal point adjustment device, a camera system, and a focal point adjustment method for an imaging device for performing focal point adjustment of a photographic lens, based on a focal point detection result.

2. Description of Related Art

Since a main subject is not always at the center of a photographic screen, a plurality of range-finding areas is provided, and focal point adjustment of a photographic lens is performed, based on a range-finding result (defocus direction and defocus amount) from each of the range-finding areas. In this case, the defocus amount obtained from each of the range-finding areas has a larger error as the distance from the optical axis center becomes larger, because of the aberration of the photographic lens or the like. Accordingly, it is proposed to calculate a correction amount for the correction of the defocus amount depending on the distance from the optical axis center to each of the range-finding areas, to perform the correction using this correction amount on the defocus amount obtained from each of the range-finding areas, and thereby to calculate an accurate defocus amount (refer to Japanese Patent Publication No. 3236799 (in the following, referred to as "Patent Literature 1")).

Recently, there is known a camera mounting a camera-shake preventing mechanism for correcting camera shake by moving an image sensor in a direction in which the camera shake is compensated. When the camera-shake preventing mechanism is operated in the method of obtaining a correction amount to correct the defocus amount depending on the distance from the optical axis center to each of the range-finding areas in the image sensor, the camera incorporating this camera-shake preventing mechanism cannot calculate an accurate defocus amount.

Figure 7:
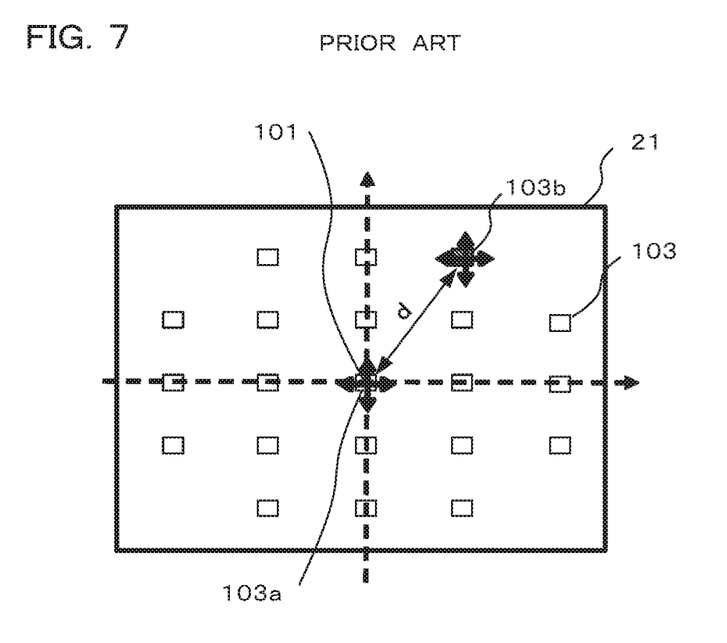
FIG. 7 is a diagram explaining that a screen center and an optical axis center are shifted from each other in a camera employing a conventional imager shift method.

This point will be explained by the use of FIG. 7. In a camera shown in FIG. 7, a plurality of range-finding areas 103 is arranged on an image sensor 21, and the plurality of range-finding areas 103 is arranged symmetrically centering a screen center 101 of the image sensor 21. In an example shown in FIG. 7, the range-finding areas 103 are arranged at three positions in the first row, five positions in each of the second to fourth rows, and three positions in the fifth row. The image sensor 21 is moved by a shift amount (Xs, Ys) by a camera-shake preventing mechanism to prevent the camera shake. Accordingly, the screen center 101 is moved by the shift amount (Xs, Ys), and a range-finding area 103a at the screen center and also a range-finding area 103b at a position apart from the optical axis center 101 by a distance d are moved by the shift amount (Xs, Ys).

In this manner, in the case of moving the image sensor (referred to as imager shift method) for preventing the camera shake, the positional relationship between the optical axis center and the screen center is shifted and the distance from the optical axis center to range-finding area is changed. That is, the distance d shown in FIG. 7 is changed. Accordingly, the accuracy of the correction amount for the defocus amount cannot be secured.

Further, in the conventional correction method, the correction amount of the defocus amount is obtained only for the distance d from the screen center. However, a specific condition of an interchangeable lens, for example, a zoom lens position or a focus lens position, is not taken into consideration, and therefore the correction amount for the defocus amount cannot be obtained accurately.

SUMMARY OF THE INVENTION

The present invention aims to provide a focal point adjustment device, a camera system, and a focal point adjustment method for an imaging device, capable of correcting a defocus amount accurately even for a case that the screen center of an image sensor is shifted from the optical axis center of an optical system.

A focal point adjustment device according to a first aspect of the present invention comprising: an image sensor having an imaging pixel and a focal point detection pixel, each of which receives a light flux having passed through a photographic lens and performs photoelectric conversion to output an image signal; a camera-shake preventing section which moves the image sensor in a direction perpendicular to an optical axis of the photographic lens to correct camera shake and also outputs information on the movement of the image sensor; a calculation section to calculate a focal point adjustment signal, based on an output of the focal point detection pixel; a memory to store a correction value for correcting the focal point adjustment signal, depending on an image height position of the focal point detection pixel; and a correction section to correct the focal point adjustment signal, depending on an output of the memory, the information output by the camera-shake preventing section, and a position of the focal point detection pixel, wherein the correction value is information indicating a ratio of an image plane movement amount at the image height position with respect to a unit image plane movement amount on the optical axis of the photographic lens, and the correction section corrects the focal point adjustment signal, based on the correction value corresponding to the image height position of the focal point detection pixel and the information output by the camera-shake preventing section on the movement of the image sensor.

A camera system according to a second aspect of the present invention comprising an interchangeable lens having a photographic optical system and a camera main body in which the interchangeable lens can be mounted, the interchangeable lens including a memory to store a correction value for focal point adjustment, depending on an image height position of an imaging region in an image sensor and to output the correction value to the camera main body, and the camera main body including: the image sensor having an imaging pixel and a focal point detection pixel, each of which receives a light flux having passed through the photographic optical system and performs photoelectric conversion to output an image signal; a calculation section to calculate a focal point adjustment signal, based on an output of the focal point detection pixel; a camera-shake preventing section which moves the image sensor in a direction perpendicular to an optical axis of the photographic optical system to correct camera shake and also outputs information on the movement of the image sensor; and a correction section to correct the focal point adjustment signal, depending on the correction value output by the memory, the information output by the camera-shake preventing section on the movement, and a position of the focal point detection pixel, wherein the correction value is information indicating a ratio of an image plane movement amount at the image height position with respect to a unit image plane movement amount on the optical axis of the photographic optical system, and the correction section corrects the focal point adjustment signal, based on the correction value corresponding to the image height position of the focal point detection pixel and the information output by the camera-shake preventing section on the movement of the image sensor.

A camera system according to a third aspect of the present invention comprising an interchangeable lens having a photographic optical system and a camera main body in which the interchangeable lens can be mounted, the interchangeable lens including: a memory to store a correction value for focal point adjustment, depending on an image height position of an imaging region in an image sensor and to output the correction value to the camera main body; and a camera-shake preventing section which moves a part of the photographic optical system in a direction perpendicular to an optical axis to correct camera shake and also outputs information on the movement of the part of the photographic optical system, and the camera main body including: an image sensor having an imaging pixel and a focal point detection pixel, each of which receives a light flux having passed through the photographic optical system and performs photoelectric conversion to output an image signal; a calculation section to calculate a focal point adjustment signal, based on an output of the focal point detection pixel; and a correction section to correct the focal point adjustment signal, depending on the correction value output by the memory, the information output by the camera-shake preventing section on the movement, and a position of the focal point detection pixel, wherein the correction value is information indicating a ratio of an image plane movement amount at the image height position with respect to a unit image plane movement amount on the optical axis of the photographic optical system, and the correction section corrects the focal point adjustment signal, based on the correction value corresponding to the image height position of the focal point detection pixel and the information output by the camera-shake preventing section on the movement of the part of the photographic optical system.

A fourth aspect of the present invention is a focal point adjustment method of an imaging device including an image sensor having an imaging pixel and a focal point detection pixel, each of which receives a light flux having passed through a photographic lens and performs photoelectric conversion to output an image signal, and a camera-shake preventing section which moves the image sensor in a direction perpendicular to an optical axis of the photographic lens to correct camera shake and also outputs information on the movement of the image sensor, the focal point adjustment method comprising: setting a focal point detection region for the image sensor; generating a focal point adjustment signal, based on outputs from a plurality of focal point detection pixels included in the focal point detection region; and correcting the focal point adjustment signal, depending on the information output by the camera-shake preventing section and a position of the focal point detection region, wherein the correction value is information indicating a ratio of an image plane movement amount at the image height position with respect to a unit image plane movement amount on the optical axis of the photographic lens, and the focal point adjustment signal is corrected, based on the correction value corresponding to the image height position of the focal point detection pixel and the information output by the camera-shake preventing section on the movement of the image sensor.

A fifth aspect of the present invention is a focal point adjustment method of an imaging device including an image sensor having an imaging pixel and a focal point detection pixel, each of which receives a light flux having passed through a photographic lens and performs photoelectric conversion to output an image signal, and a camera-shake preventing section which moves a lens section included in the photographic lens in a direction perpendicular to an optical axis of the photographic lens to correct camera shake and also outputs information on the movement of the lens section, the focal point adjustment method comprising: setting a focal point detection region for the image sensor; generating a focal point adjustment signal, based on outputs from a plurality of focal point detection pixels included in the focal point detection region: and correcting the focal point adjustment signal, depending on the information output by the camera-shake preventing section and a position of the focal point detection region, wherein the correction value is information indicating a ratio of an image plane movement amount at the image height position with respect to a unit image plane movement amount on the optical axis of the photographic lens, and the focal point adjustment signal is corrected, based on the correction value corresponding to the image height position of the focal point detection pixel and the information output by the camera-shake preventing section on the movement of the lens section.

DETAILED DESCRIPTION OF THE PREFERRED EMBODIMENTS

Figure 1:
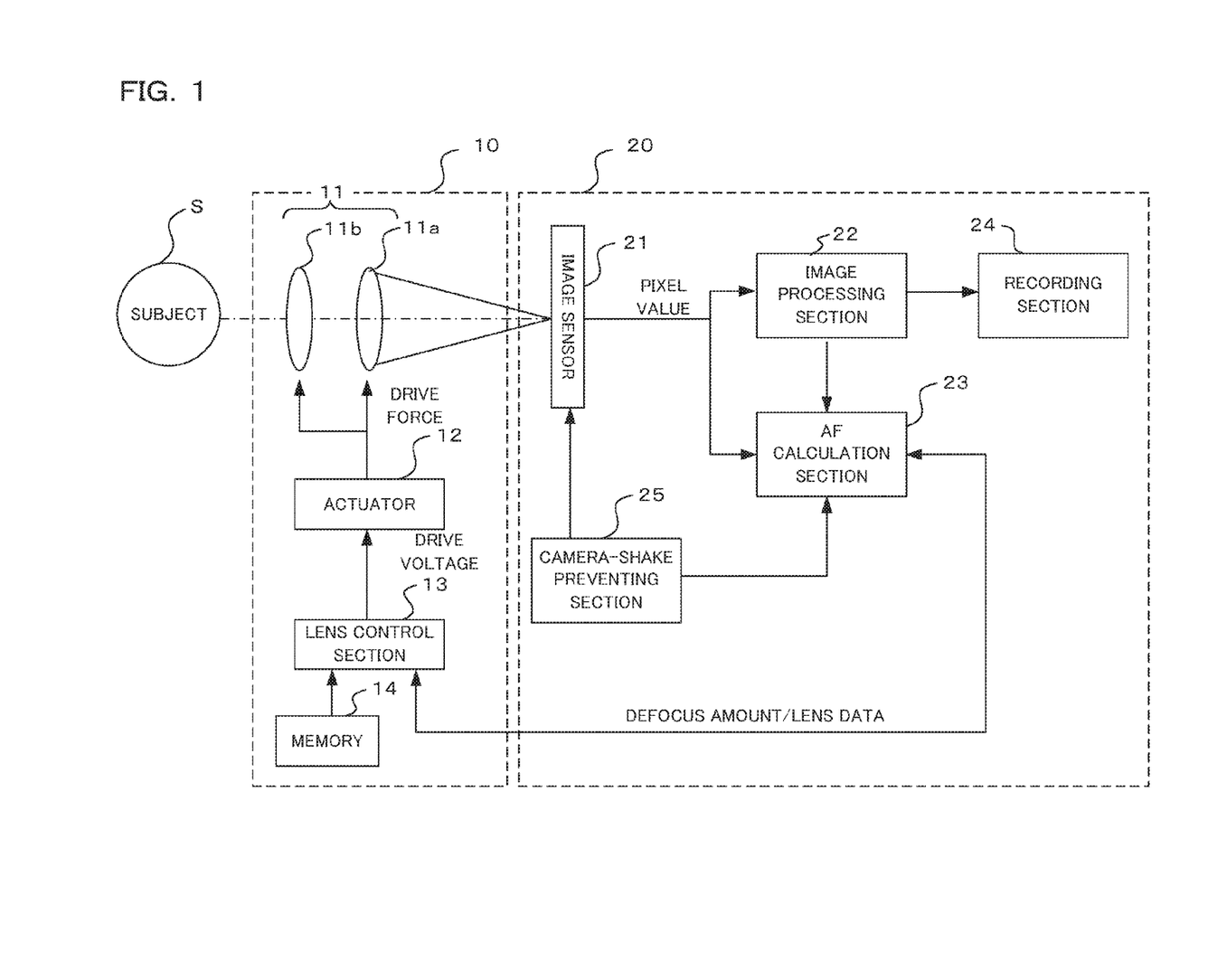
FIG. 1 is a block diagram mainly showing an electrical configuration of a camera according to a first embodiment of the present invention.

Hereinafter, a preferable embodiment will be explained by the use of a digital camera to which the present invention is applied (in the following, simply described as a "camera") according to the drawings. FIG. 1 is a block diagram mainly showing an electrical configuration of a camera according to a first embodiment of the present invention. The camera according to the present embodiment is configured with an interchangeable lens barrel 10, and a camera main body 20 in which this interchangeable lens barrel 10 can be mounted. The interchangeable lens barrel 10 and the camera main body 20, while configured separately in the present embodiment, obviously may be configured in a unit as in a typical compact camera.

A photographic lens 11 is disposed inside the interchangeable lens barrel 10. The photographic lens 11 includes a focus lens 11a and a zoom lens 11b (photographic lens 11 when these lenses are called collectively), and is configured with a plurality of optical lenses for forming the optical image of a subject S. The focus lens 11a is a lens to perform focal point adjustment and the zoom lens 11b is a lens to change a focal length, and both lenses are movable in the optical axis direction.

Further, an actuator 12 and a lens control section 13 are provided inside the interchangeable lens barrel 10. The lens control section 13 includes a CPU or the like and performs control of the interchangeable lens barrel 10 according to a program stored in a memory 14 or a control signal from an AF calculation section 23 inside the camera main body 20. For example, the lens control section 13 receives a defocus amount from the AF calculation section 23 inside the camera main body 20, and performs control of the actuator 12 based on this information. The actuator 12 includes a plurality of actuators and moves the photographic lens 11 in the optical axis direction to perform the focal point adjustment, power zooming, or the like. Further, the lens control section 13 detects the position of the focus lens 11a or the zoom lens 11b, and transmits this detection result to the AF calculation section 23.

Further, the memory 14 is provided in the interchangeable lens barrel 10. This memory 14 includes an electrically rewritable nonvolatile memory, and stores a program for controlling the interchangeable lens barrel 10. The above lens control section 13 controls the inside of the interchangeable lens barrel 10 according to this program. The memory 14 also stores various kinds of adjustment value and the like of the interchangeable lens barrel 10. Further, the memory 14 stores a correction value for correcting a focal point adjustment signal, depending on an image height position of a focal point detection pixel. Furthermore, the memory 14 stores the correction value for the aberration of the photographic lens 11 depending on the image height position. The memory 14 stores the correction values depending on the focal length of the photographic lens 11 which can be changed by the movement of the zoom lens 11b. The memory 14 stores the correction values depending on the position of the focal point adjustment lens (e.g., focus lens 11a). The memory 14 stores the adjustment values, the correction value, and the like at the shipment from a factory or the like. These adjustment values, the correction value, and the like are output to the AF calculation section 23 inside the camera main body 20 via the lens control section 13.

The camera main body 20 includes an image sensor 21, an image processing section 22, the AF calculation section 23, a recording section 24, and a camera-shake preventing section 25.

The image sensor 21 is disposed on the optical axis of the photographic lens 11 near an image forming position of the subject. The image sensor 21 is provided with a plurality of pixels each having a photo-electric conversion section to convert a subject image (optical image) into an electrical signal. The plurality of pixels includes a focal point detection pixel configured so as to restrict the incident direction of a light flux entering the pixel (also called a phase difference detection pixel) and an imaging pixel configured so as not to restrict the light flux entering the pixel in less amount than the focal point detection pixel, and the plurality of pixels is arranged two-dimensionally. The focal point detection pixel is disposed inside the range-finding area 103 (refer to FIG. 7).

The image sensor 21 outputs pixel values output from the focal point detection pixel and the imaging pixel to the image processing section 22 and the AF calculation section 23. The image processing section 22 inputs the pixel value from the imaging pixel out of the pixel values, and performs image processing for a live-view display image and a recording image. Further, the image processing section 22 outputs image data processed for recording to the recording section 24. The recording section 24 includes an electrically rewritable nonvolatile memory which is detachable from the camera main body 20, and inputs the image data for the recording to record the image data. The image sensor 21 functions as an image sensor including the imaging pixel and the focal point detection pixel, each of which receives the light flux having passed through the photographic lens and performs the photo-electric conversion to output an image signal.

The AF calculation section 23 includes a control section such as a CPU, inputs a pixel value from the focal point detection pixel out of the pixel values, and performs AF calculation based on the phase difference detection method. In the AF calculation, a plurality of range-finding areas is set corresponding to the positions of the focal point detection pixels, based on a center coordinate position obtained from the image processing section 22, and a defocus amount is calculated for each of these set range-finding areas. Then, the priority of the set range-finding areas is determined and further the reliability of the defocus amount for the range-finding area is determined, and a range-finding area for the focal point adjustment of the photographic lens 11 is selected from among the plurality of range-finding areas, based on the priority and the reliability. The defocus direction and the defocus amount calculated in the AF calculation section 23 are output to the lens control section 13 inside the interchangeable lens barrel 10, and the lens control section 13 performs the focal point adjustment, based on the defocus direction and the defocus amount. The AF calculation section 23 functions as a calculation section to calculate the focal point adjustment signal, based on the output of the focal point detection pixel.

The camera-shake preventing section 25 includes a camera-shake detection section using an angular speed sensor, an acceleration sensor, or the like to detect an operation applied to the camera main body 20 such as camera shake, and has an image sensor shift mechanism to move the image sensor 21 in a plane perpendicular to the optical axis, based on a detection signal of this camera-shake detection section so as to compensate the operation such as the camera shake. Further, the camera-shake preventing section 25 outputs information output to the image sensor shift mechanism on the movement, also to the AF calculation section 23. The camera-shake preventing section 25 functions as a camera-shake preventing section which moves the image sensor in a direction perpendicular to the optical axis of the photographic lens to correct the camera shake and also outputs the information on the movement.

The above AF calculation section 23 corrects the defocus amount calculated based on the pixel value from the focal point detection pixel of the image sensor 21 using the correction value output from the memory 14 inside the interchangeable lens barrel 10, the information output from the camera-shake preventing section 25 on the movement of the image sensor 21 for correcting the camera shake, and a position selected as the range-finding area. That is, when the camera-shake preventing section 25 moves (shifts) the image sensor 21 for camera shake correction, the AF calculation section 23 corrects the defocus amount in consideration of this shift amount. The AF calculation section 23 functions as a correction section to correct the focal point adjustment signal depending on the output of the memory 14, the information output by the camera-shake preventing section 25, and the position of the focal point detection pixel. This correction will be described below by the use of step S7 of FIG. 2 and FIG. 3.

Next, by the use of a flowchart shown in FIG. 2 and FIG. 3, an operation in the present embodiment will be explained. This flowchart mainly shows an operation regarding focus adjustment. This operation is carried out by the CPU or the like according to a program, for example, in the AF calculation section 23.

Figure 2:
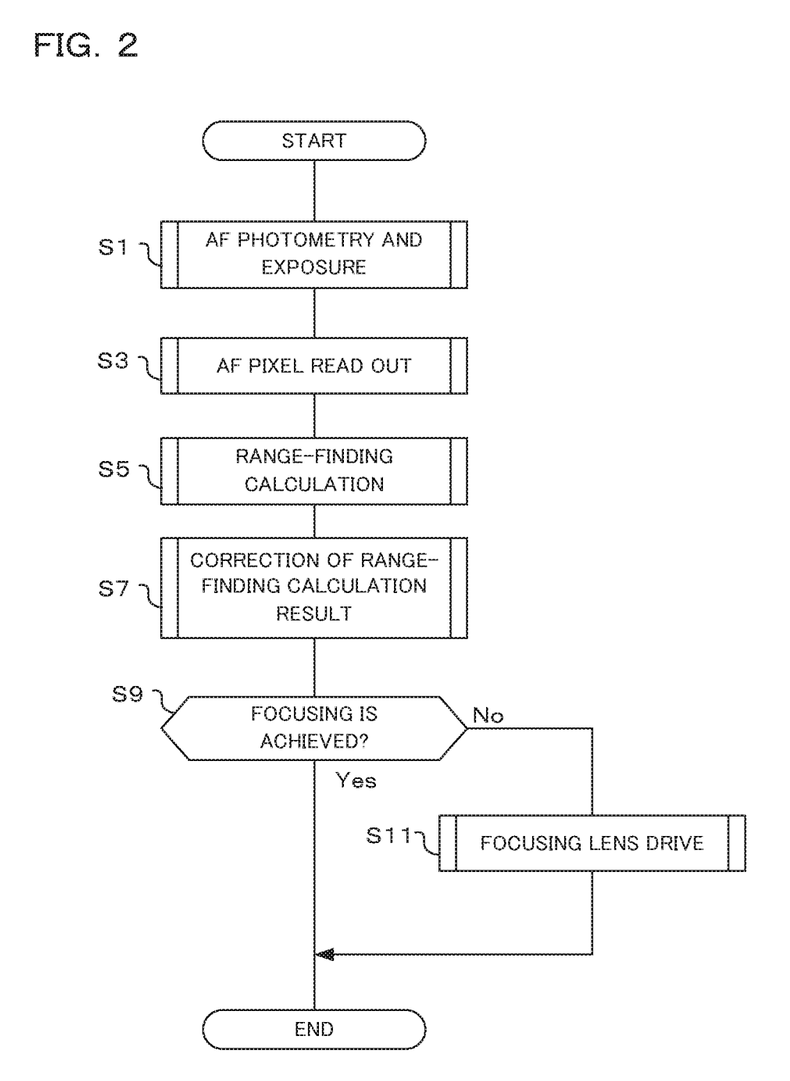
FIG. 2 is a flowchart showing a camera operation according to the first embodiment of the present invention.

When the camera main body 20 is powered on and the focal point adjustment operation is instructed by the operation of a non-illustrated release button or the like, the flow shown in FIG. 2 is started. First, AF photometry and exposure is performed (S1). In this step, the image sensor 21 performs exposure for performing focal point detection by the focal point detection pixel inside the image sensor 21. As explained by the use of FIG. 7, the plurality of range-finding areas 103 is set in the image sensor 21, and each of the plurality of focal point detection pixels in each range-finding area 103 is exposed.

After the AF photometry and exposure, next, AF pixel readout is performed (S3). In this step, after the finish of the exposure in step S1, the pixel value is read out from the focal point detection pixel, and the pixel value is output to the AF calculation section 23.

After the AF pixel read out, next, range-finding calculation is performed (S5). In this step, the AF calculation section 23 calculates the focal point adjustment signal (defocus direction and defocus amount) by the so-called phase difference detection method, based on the pixel value from the focal point detection pixel which is read out in step S3. In the calculation of the focal point adjustment signal, when the range-finding area is set manually, the pixel value from the focal point detection pixel in the manually set range-finding area (focal point detection region) is selected, and, when the range-finding area is set automatically, the defocus amount, a contrast value, a face detection result, and the like are obtained, based on the pixel values from the focal point detection pixel in each of the range-finding areas and the imaging pixel, and the range-finding area (focal point detection region) is set therefrom. After the range-finding area is determined in step S5, the focal point adjustment signal is generated based on the outputs of the plurality of focal point detection pixels included in the range-finding area.

After the range-finding calculation, next, the range-finding calculation result is corrected (S7). In this step, when the camera shake correction is performed with the imager shift by the camera-shake preventing section 25, the focal point adjustment signal is corrected by the use of information on the movement of the image sensor 21 at this time and a correction value depending on the position of the range-finding area output from the memory 14. Detailed operation in step S7 will be described below by the use of FIG. 3.

After the correction of the range-finding calculation result, next, it is determined whether or not focusing is achieved (S9). In this step, it is determined whether or not the defocus amount in the range-finding calculation result corrected in step S7 falls in a predetermined focusing range. That is, if the defocus amount is not larger than a predetermined value, it is determined that the focusing is achieved.

If the focusing is not achieved as the result of the determination in step S9, focus lens drive is performed (S11). In this step, the AF calculation section 23 transmits the focal point adjustment signal (including the defocus amount) of the range-finding calculation result to the lens control section 13 inside the interchangeable lens barrel 10, and the lens control section 13 causes the actuator 12 to move the focus lens 11*a* to the position based on the focal point adjustment signal.

After the focus lens drive in step S11, or when the focusing is achieved as the result of the determination in step S9, the flow shown in FIG. 2 is finished.

Next, by the use of FIG. 3, the correction of the range-finding calculation result in step S7 of FIG. 2 will be explained. In this flow, first, interpolation of sensitivities FR_M and FR_S is performed (S21). The sensitivity indicates a ratio of an image plane movement amount at a predetermined image height position with respect to a unit image plane movement amount on the optical axis of the photographic lens, and is one format of the correction value for correcting the defocus amount. Here, FR_M expresses a sensitivity in a meridional plane and FR_S expresses a sensitivity in a sagittal plane. That is, these sensitivities FR_M and FR_S express the correction values for performing the correction depending on an optical aberration of the photographic lens 11 for the defocus amount calculated in step S5.

Figure 3:
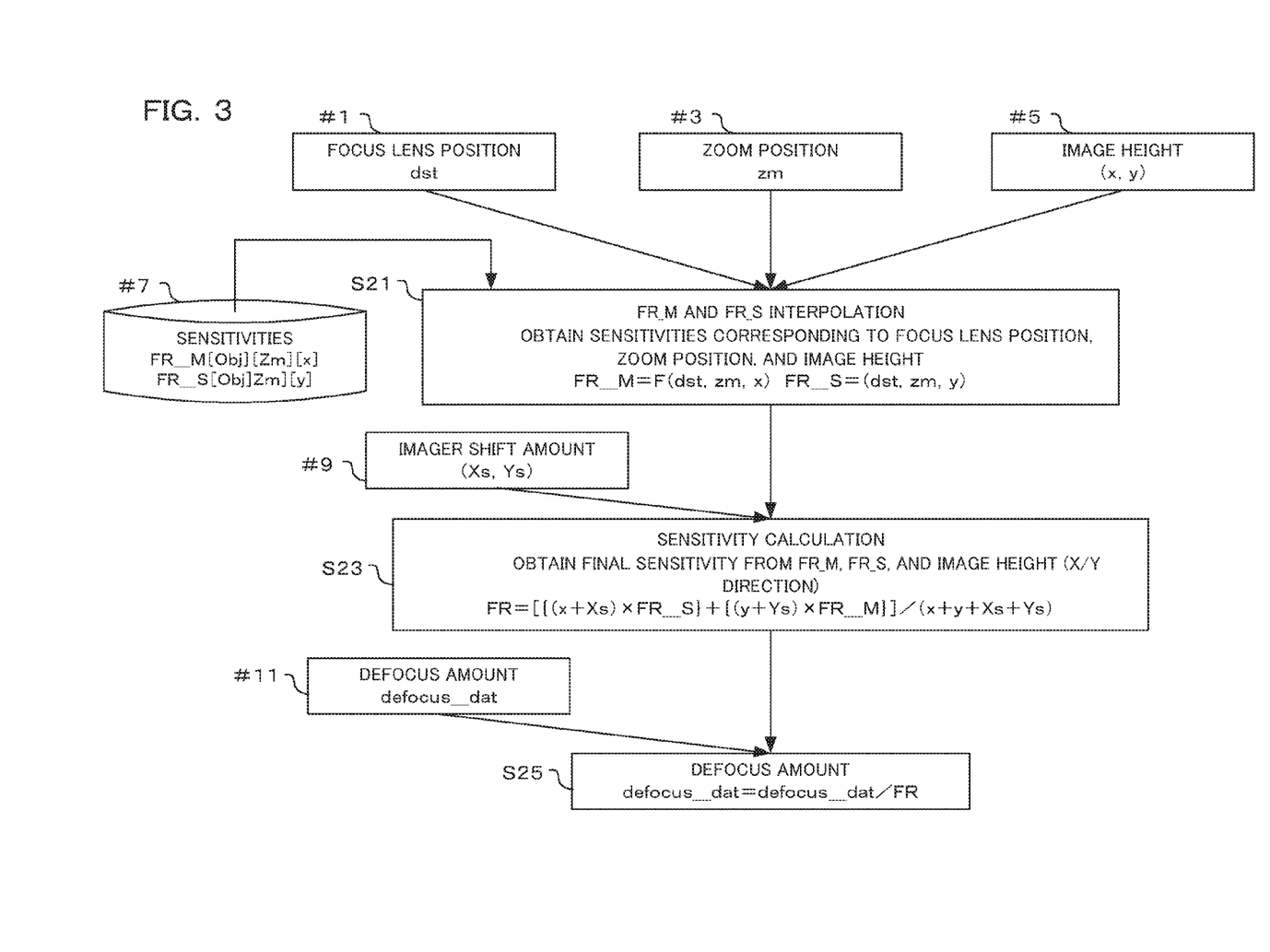
FIG. 3 is a flowchart showing an operation of correcting a range-finding calculation result in a camera according to the first embodiment of the present invention.

The sensitivities FR_M and FR_S are stored in the memory 14 inside the interchangeable lens barrel 10 as a sensitivity table #7 (refer to FIG. 3). The sensitivity FR_M and the sensitivity FR_S stored in this sensitivity table #7 are stored in a table format corresponding to a representative point Obj of the focus lens position, a representative point Zn of the zoom position, the distance x of the range-finding area from the optical axis center (X direction), and a distance y of the range-finding area from the optical axis center (Y direction). The representative point Obj of the focus lens position corresponds to the position of the focus lens 11*a*, the representative point Zn of the zoom position corresponds to the position of the zoom lens 11*b*, and the distances x and y correspond to the coordinates (x,y) of the center point in each of the range-finding areas. The sensitivities change depending on the optical aberration of the photographic lens 11, and these sensitivities change depending on the positions of the focus lens 11*a* and the zoom lens 11*b* inside the photographic lens 11 and the position of the range-finding area on the plane of the image sensor 21. The sensitivity table #7 stored in the memory 14 stores the sensitivities FR_M and FR_S corresponding to the representative values on the basis of the balance with a memory capacity.

In step S21, interpolation calculation is performed for the sensitivities FR_M and FR_S. That is, the focus lens position dst (#1), the zoom position zm (#3), the image height (x,y) (#5) are input, and the sensitivities FR_M=(dst, zm, x) and FR_S=(dst, zm, y) are obtained accurately by the interpolation calculation by the use of these values and the representative values stored in the sensitivity table #7. Here, the focus lens position dst (#1) and the zoom position zm (#3) are detected by the lens control section 13 inside the interchangeable lens barrel 10, and this detection result is transmitted to the AF calculation section 23. Further, for the image height (x,y) (#5), the range-finding area for generating the focal point adjustment signal is selected from among the plurality of range-finding areas in the range-finding calculation in step S5, and the center coordinates (x,y) of this selected range-finding area are used.

Figure 4A:
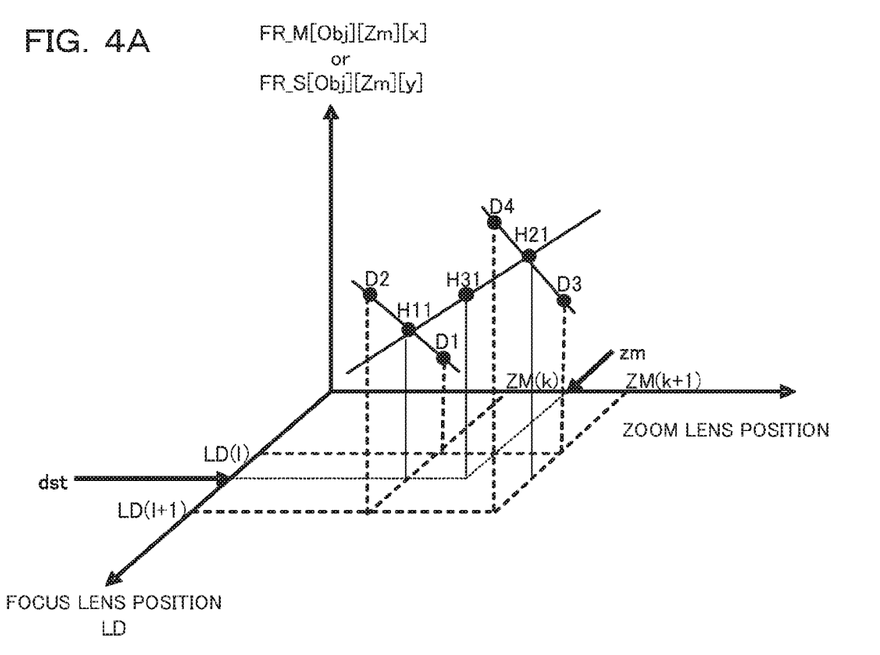
FIG. 4A and FIG. 4B are diagrams each explaining a correction sensitivity approximate function in a camera according to the first embodiment of the present invention.

The interpolation calculation of the sensitivities FR_M and FR_S in step S21 will be explained by the use of FIG. 4A and FIG. 4B. In FIG. 4A, the x-axis expresses the zoom position, the y-axis expresses the focus lens position, and the z-axis expresses the sensitivities FR_M and FR_S corresponding to these positions. As described above, the sensitivity table #7 stores only the sensitivities corresponding to the representative points, and, in an example shown in FIG. 4A, the sensitivity table #7 stores a sensitivity D1 corresponding to LD (i) and ZM (k), a sensitivity D2 corresponding to LD (i+1) and ZM (k), a sensitivity D3 corresponding to LD (i) and ZM (k+1), and a sensitivity D4 corresponding to LD (i+1) and ZM (k+1) as the sensitivity FR_M or FR_S.

Since the sensitivity FR_M or FR_S directly corresponding to the focus lens position dst and the zoom position zm shown in FIG. 4A does not exist, this sensitivity is obtained by the interpolation. First, a sensitivity H11 is calculated by the interpolation of the sensitivities D1 and D2, and a sensitivity H21 is calculated by the interpolation of the sensitivities D3 and D4. Then, a sensitivity H31 is calculated by the interpolation of the sensitivities H11 and H21. This sensitivity H31 is a sensitivity corresponding to the focus lens position dst and the zoom position zm.

After the sensitivity corresponding to the focus lens position dst and the zoom position zm is obtained, further the sensitivity is converted into a sensitivity in consideration of the image height (x,y). FIG. 4B expresses the image height (X direction) in the horizontal axis and the sensitivity FR_M in the vertical axis. Note that the graph expressing the image height (Y direction) in the horizontal axis and the sensitivity FR_S in the vertical axis is similar to that of FIG. 4B and is omitted.

Figure 4B:
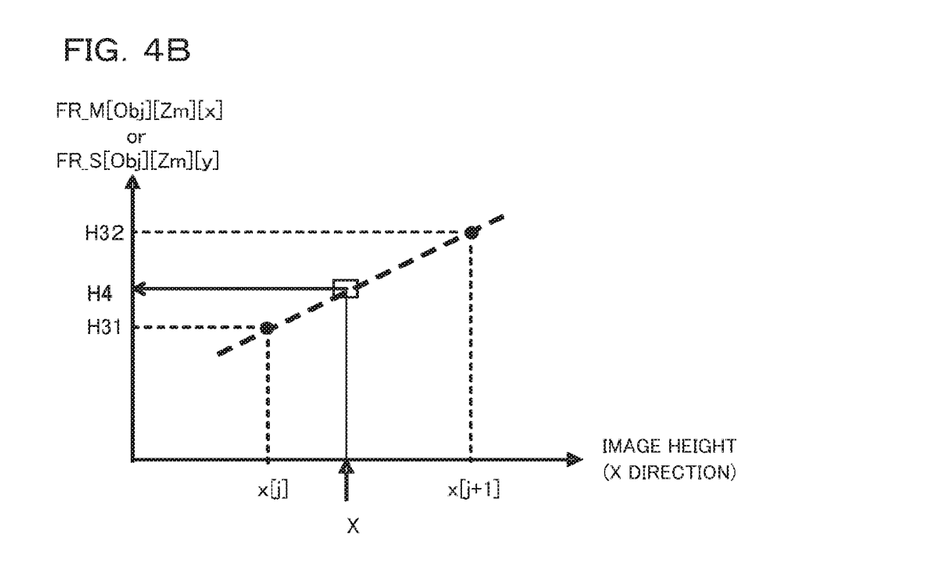

While the sensitivity H31 is obtained by the interpolation in the example shown in FIG. 4A, FIG. 4B shows the case of an image height x[j]. The sensitivity table #7 of the memory 14 stores a table corresponding to an image height x[j+1], a sensitivity H32 is calculated for the case of image height x[j+1] by similar interpolation processing as in FIG. 4A. A sensitivity H4 at an image height x where the range-finding area belongs is calculated by the interpolation processing by the use of a point determined by the image height x[j] and the sensitivity H31 and a point determined by the image height x[j+1] and the sensitivity H32. This sensitivity H4 is the sensitivity FR_M calculated in step S21. Further, similarly a sensitivity at an image height y where the range-finding area belongs is calculated by the interpolation processing by the use of an image height y[j], an image height y[j+1], and the sensitivities at these points, and this sensitivity is the sensitivity FR_S calculated in step S21.

After the sensitivities FR_M and FR_S are calculated by the interpolation in step S21, next, sensitivity calculation is performed (S23). In this step, the movement amount of the image sensor 21 (also called imager shift amount) (Xs, Ys) for the camera shake correction is input from the camera-shake preventing section 25, the sensitivities FR_M and FR_S are obtained by the interpolation processing in consideration of the movement amount of the image sensor 21. That is, since the sensitivities FR_M and FR_S calculated in step S21 are sensitivities at the image height (x,y) determined by the range-finding area, a sensitivity at an image height (x+Xs, y+Ys) which is shifted from the image height (x,y) by the imager shift amount (Xs, Ys) is calculated by the interpolation processing with the method explained by the use of FIG. 4B.

After the calculation of sensitivities FR_M and FR_S by the interpolation processing in consideration of the imager shift amount (Xs, Ys), a final sensitivity is calculated by following formula (1).

$$FR=[\{(x+Xs)\times FR\_S\}+\{(y+Ys)\times FR\_M\}]/(x+y+Xs+Ys) \quad (1)$$

In step S23, after the sensitivity calculation, next, a defocus amount is calculated in consideration of the sensitivity (S25). This step calculates the defocus amount by dividing the defocus amount (defocus_dat) #11 calculated in step S5 (refer to FIG. 2) by the sensitivity FR calculated in step S23. That is, the defocus amount is calculated by the following formula (2).

$$defocus\_dat=defocus\_dat/FR \quad (2)$$

The defocus amount defocus_dat calculated by the above formula (2) takes the imager shift amount (Xs, Ys) into consideration in addition to the focus lens position dst, the zoom position zm, and the image height (x,y). Therefore, even when the camera-shake preventing mechanism is operated for preventing the camera shake, it becomes possible to remove the influence of the optical aberration in the photographic lens 11 and to perform highly accurate focal point adjustment.

In step S25, after the calculation of the defocus amount, the subroutine of correcting the range-finding calculation result is finished, and the process returns to the main flow shown in FIG. 2.

As explained above, the first embodiment of the present invention includes: the camera-shake preventing section 25 which moves the image sensor 21 in the direction perpendicular to the optical axis of the photographic lens 11 to correct the camera shake and outputs the information on the movement (imager shift amount); and the AF calculation section 23 to calculate the focal point adjustment signal (defocus amount and the like) based on the output from the focal point detection pixel in the image sensor 21, and corrects the focal point adjustment signal using the information on the movement of the image sensor 21 (imager shift amount) (refer to S23 of FIG. 3). Accordingly, even when the screen center of the image sensor and the optical axis center of the optical system are shifted from each other, it is possible to correct the defocus amount accurately.

Note that, in the present embodiment, the influence of the position (x,y) on the image sensor 21 is taken into consideration in step S21, and the influence of the shift amount (Xs, Ys) by the imager shift is taken into consideration in step S23. That is, the influence of the position is removed in two steps. However, since both of the processing steps remove the influence of the position on the image sensor 21, the influences of the positions may be removed in one step. That is, when the interpolation processing of the FR_M and FR_S is performed in step S21, the interpolation processing may be performed including the image height (x,y) and the imager shift amount (Xs, Ys).

Further, while the formula (2) calculating the above defocus amount divides the defocus amount by the sensitivity FR, another function formula such as a formula of multiplying the defocus amount by the sensitivity FR or the like may be used depending on a generation method of the sensitivity FR (correction value).

Figure 5:
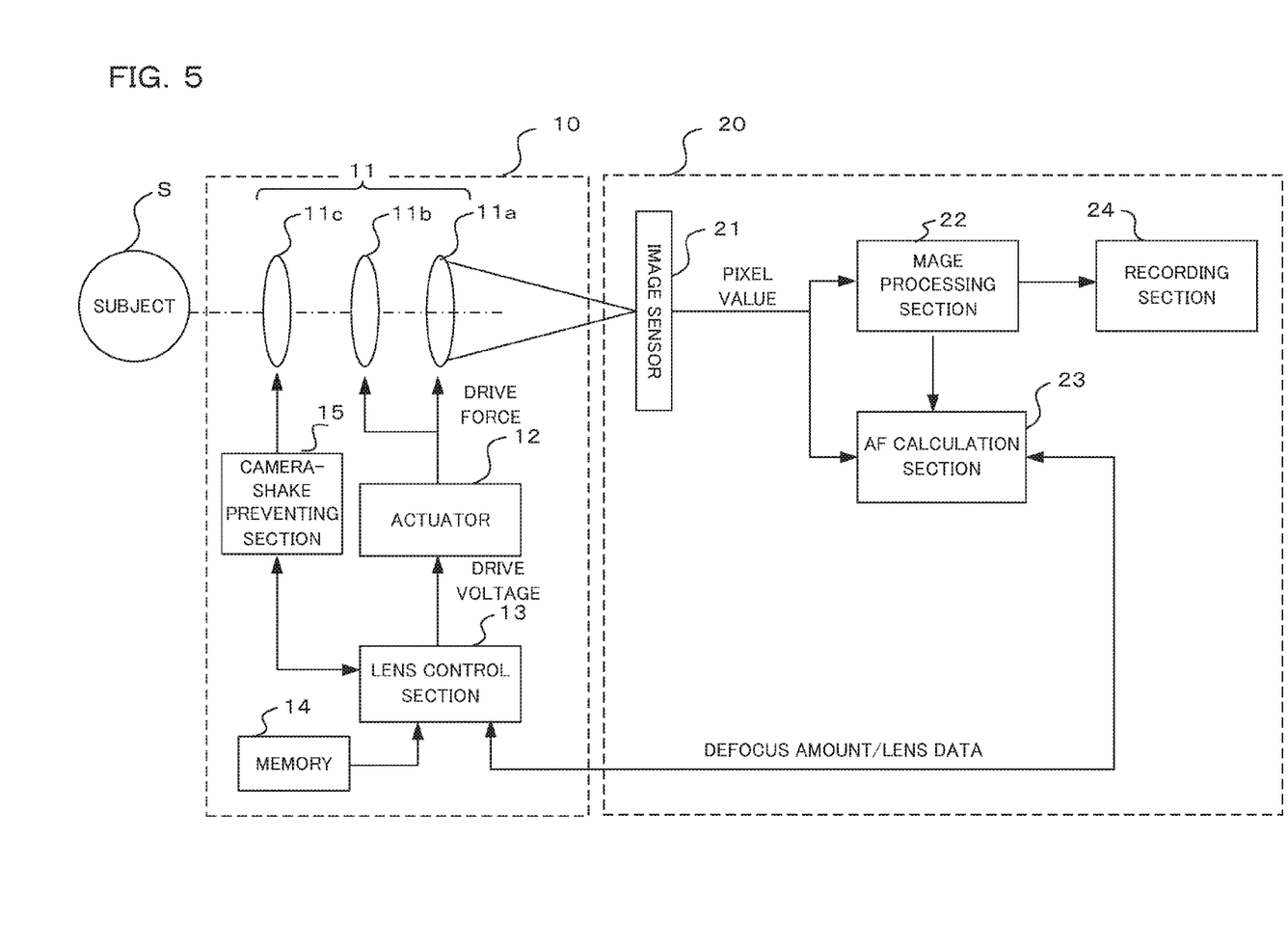
FIG. 5 is a block diagram mainly showing an electrical configuration of a camera according to a second embodiment of the present invention.

Next, a second embodiment of the present invention will be explained by the use of FIG. 5. In the first embodiment, the camera-shake preventing section 25 is provided inside the camera main body 20, and the image sensor 21 is moved in the plane perpendicular to the optical axis of the photographic lens 11 so as to compensate movement of the camera shake. On the other hand, in the second embodiment, a camera-shake preventing section 15 is provided inside the interchangeable lens barrel 10, and a camera-shake preventing lens 11c in the photographic lens 11 is moved in the plane perpendicular to the optical axis so as to compensate movement of the camera shake.

The configuration of the present embodiment will be explained by the use of FIG. 5. The explanation of the same configuration as that of the first embodiment will be omitted and explanation will be made centering a different point. In the present embodiment, the camera-shake preventing section 25 is removed from the camera main body 20, and instead the camera-shake preventing section 15 is provided inside the interchangeable lens barrel 10. Further, the camera-shake preventing lens 11c is disposed at a part of the photographic lens 11 inside the interchangeable lens barrel 10. The camera-shake preventing lens 11c is movable in a plane perpendicular to the optical axis of the photographic lens 11. When the camera-shake preventing lens 11c is moved in the plane perpendicular to the optical axis, the optical axis center is also moved.

The camera-shake preventing section 15 includes a camera-shake detection section using an angular speed sensor, an acceleration sensor, or the like to detect an operation applied to the camera main body 20 and the interchangeable lens barrel 10 such as the camera shake, and includes a camera-shake preventing lens shift mechanism which moves the camera-shake preventing lens 11c in the plane perpendicular to the optical axis of the photographic lens 11 based on a detection signal of this camera-shake detection section so as to compensate the operation such as the camera shake. Further, the camera-shake preventing section 15 outputs information output to the camera-shake preventing lens shift mechanism on the movement, to the AF calculation section 23 via the lens control section 13. The camera-shake preventing section 15 functions as a camera-shake preventing section which moves apart of the photographic lens in a direction perpendicular to the optical axis to correct the camera shake and also outputs the information on the movement.

Figure 6:
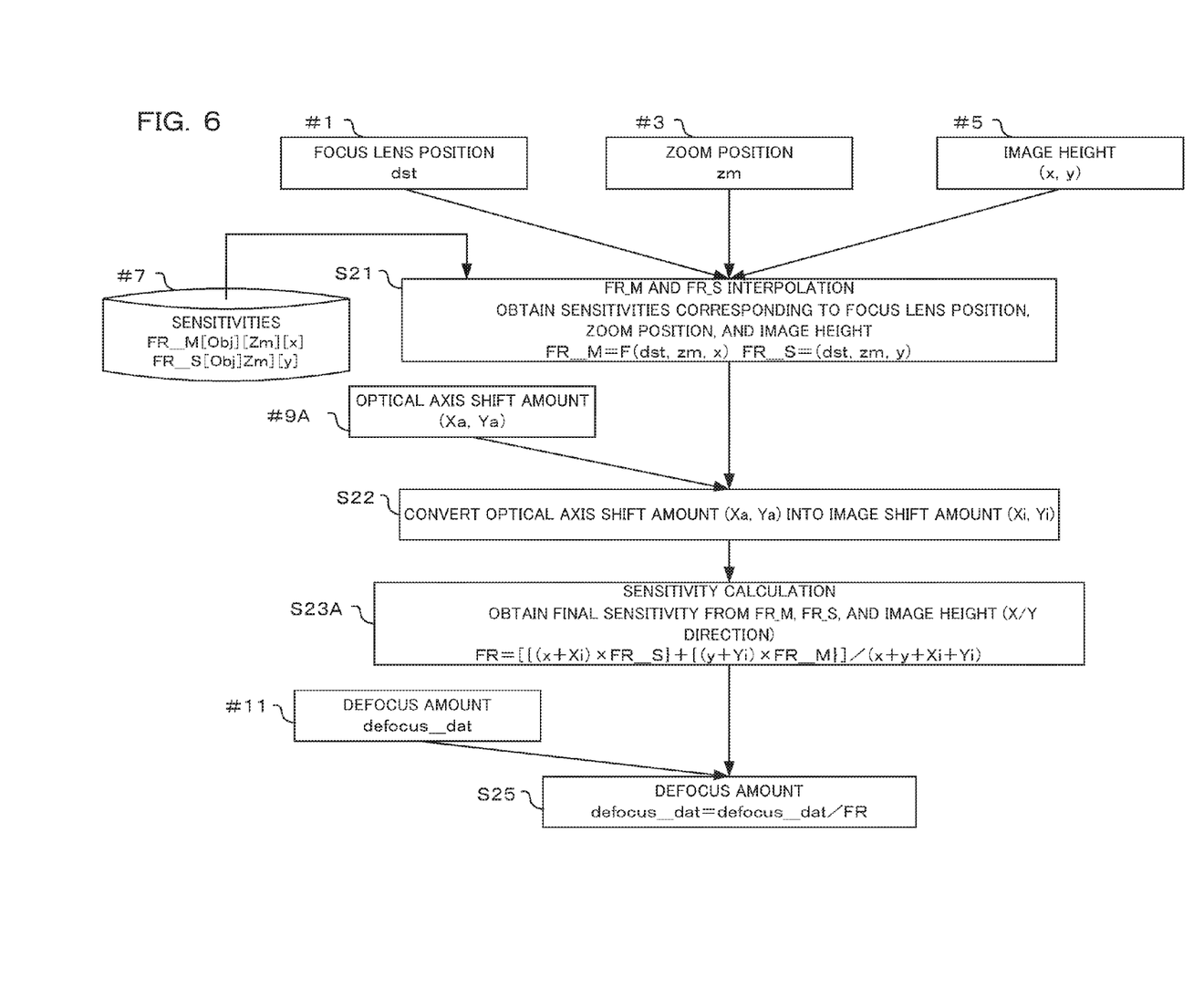
FIG. 6 is a flowchart showing an operation of correcting a range-finding calculation result in a camera according to the second embodiment of the present invention.

Operation in the present embodiment is the same as that in the case of the first embodiment, corrects the range-finding result along the flow shown in FIG. 2 and FIG. 6, and will be explained centering a different point. FIG. 6 shows a flow different from the flow of FIG. 3 in the following point.

Instead of the imager shift amount #9 output from the camera-shake preventing section 25 inside the camera main body 20 in the first embodiment shown in FIG. 3, in the present embodiment shown in FIG. 6, the AF calculation section 23 inputs an optical axis shift amount (Xa, Ya) #9A which is a shift amount (including the shift direction) of the optical axis in the camera-shake preventing lens 11c output from the camera-shake preventing section 15 inside the interchangeable lens barrel 10. Then, in step S22, the AF calculation section 23 converts the optical axis shift amount (Xa, Ya) into an imager shift amount (Xi, Yi) which is a shift amount of an image on the image sensor 21. A conversion formula to convert the optical axis shift amount of the camera-shake preventing lens 11c into the imager shift amount on the image sensor 21 is stored in the memory 14 inside the interchangeable lens barrel 10. The AF calculation section 23 receives the conversion formula from the lens control section 13 and stores the conversion formula. Further, the conversion formula is changed according to information on the change in the focus lens position dst or the zoom lens position zm.

Note that, while the lens control section 13 transmits the above conversion formula to the AF calculation section 23, the lens control section 13 may convert the optical axis shift amount (Xa, Ya) into the imager shift amount, based on the above conversion formula to transmit the calculated imager shift amount to the AF calculation section 23. At this time, the conversion formula is modified according to the optical condition such as the focus lens position dst and the zoom lens position zm. In this case, the data amount transmitted from the lens control section 13 to the AF calculation section 23 is reduced, and therefore time lag caused by the communication can be reduced. Further, sometimes information on the camera main body 20 (such as optical path length) becomes necessary for the conversion of the optical axis shift amount into the imager shift amount. In this case, the information on the camera main body 20 is transmitted from the AF calculation section 23 to the lens control section 13, and the lens control section 13 reflects this information to calculate the imager shift amount.

Next, the sensitivity calculation is performed (S23A). In this step, the sensitivities FR_M and FR_S are obtained by the interpolation processing in consideration of the imager shift amount, based on the image shift amount (Xi, Yi) on the image sensor 21 which is calculated based on the optical axis shift amount output from the camera-shake preventing section 15 for the camera shake correction. That is, the sensitivities FR_M and FR_S calculated in step S21 are sensitivities at the image height (x,y) determined by the range-finding area, and therefore the sensitivities at the image height (x+Xi, y+Yi) which is shifted from the image height (x,y) by the imager shift amount (Xi, Yi), are calculated by the interpolation processing with the method explained by the use of FIG. 4B.

After the calculation of the sensitivities FR_M and FR_S by the interpolation processing in consideration of the imager shift amount (Xi, Yi), the final sensitivity is calculated by the following formula (3).

$$FR=[\{(x+Xi) \times FR\_S\}+\{(y+Yi) \times FR\_M\}]/(x+y+Xi+Yi) \qquad (3)$$

Here, while the imager shift amount in the first embodiment and the imager shift amount in the second embodiment have the same direction and opposite signs for the image height position shift direction, this difference is taken into consideration in formula (3). The other operation is the same as the flowchart of FIG. 2 and FIG. 3.

In this manner, the second embodiment of the present invention includes the camera-shake preventing section 15 which moves a part of the photographic lens (camera-shake preventing lens 11c) in the direction perpendicular to the optical axis to correct the camera shake and also outputs the information on the movement, and the AF calculation section 23 to calculate the focal point adjustment signal (defocus amount and the like), based on the output of the focal point detection pixel in the image sensor 21, and corrects the focal point adjustment signal using the information on the movement (refer to S23A of FIG. 6). Accordingly, even when the screen center of the image sensor and the optical axis center of the optical system are shifted from each other, it is possible to correct the defocus amount accurately.

As explained above, each of the embodiments of the present invention includes the image sensor 21 having the imaging pixel and the focal point detection pixel, each of which receives a light flux having passed through the photographic lens 11 and performs the photoelectric conversion to output the image signal, the camera-shake preventing section 25 or 15 to correct the camera shake and also output the information on the movement, the AF calculation section 23 to calculate the focal point adjustment signal, based on the output of the focal point detection pixel, the memory 14 to store the correction value for correcting the focal point adjustment signal depending on the image height position of the focal point detection pixel, and the correction section (AF calculation section 23) to correct the focal point adjustment signal depending on the output of the memory 14, the information output by the camera-shake preventing section 25 or 15, and the position of the focal point detection pixel. In this manner, the focal point adjustment signal is corrected by the use of the information on the movement when the image sensor 21 or the camera-shake preventing lens 11c is moved for correcting the camera shake. Accordingly, even when the screen center of the image sensor and the optical axis center of the optical system are shifted from each other, it is possible to correct the defocus amount accurately.

Note that, while the memory to store the correction value for correcting the focal point adjustment signal is provided inside the interchangeable lens barrel 10 in each of the embodiments of the present invention, obviously the memory may be provided inside the camera main body in a case of configuring a lens barrel and a camera main body in a unit, or the like.

Further, while each of the embodiments of the present invention has been explained by the use of the digital camera as a device for photographing, the camera may be a digital single-lens reflex camera, a compact digital camera, a motion picture camera such as a video camera and a movie camera, or a camera built in a mobile phone, a smartphone, a mobile information terminal (PDA: Personal Digital Assist), a personal computer (PC), a tablet-type computer, a game machine or the like.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focal point adjustment device, comprising:
an image sensor having an imaging pixel which receives a light flux having passed through a photographic lens and performs photoelectric conversion to output an image signal, and a focal point detection pixel;
a camera-shake preventing section which moves the image sensor in a direction perpendicular to an optical axis of the photographic lens to correct camera shake and also outputs information of the movement of the image sensor;
a calculation section to calculate a focal point adjustment signal, based on an output of the focal point detection pixel;
a memory to store a correction value for correcting the focal point adjustment signal, depending on an image height position of the focal point detection pixel; and
a correction section to correct the focal point adjustment signal, based on an output of the memory, the information output by the camera-shake preventing section, and a position of the focal point detection pixel, wherein
the correction value is information indicating a ratio of an image plane movement amount at the image height position with respect to a unit image plane movement amount on the optical axis of the photographic lens, and
the correction section corrects the focal point adjustment signal, based on the correction value corresponding to the image height position of the focal point detection pixel and the information output by the camera-shake preventing section of the movement of the image sensor.

2. The focal point adjustment device according to claim 1, wherein
the photographic lens includes a lens which can moves in an optical axis direction and can adjust a focal length, and
the memory stores a correction value depending on the focal length.

3. The focal point adjustment device according to claim 1, wherein
the photographic lens includes a focal point adjustment lens which moves in an optical axis direction, and
the memory stores a correction value depending on a position of the focal point adjustment lens.

4. A camera system comprising an interchangeable lens having a photographic optical system and a camera main body in which the interchangeable lens is mounted,
the interchangeable lens including a memory to store a correction value for focal point adjustment, depending on an image height position of an imaging region in an image sensor and to output the correction value to the camera main body, and
the camera main body including:
the image sensor having an imaging pixel which receives a light flux having passed through the photographic optical system and performs photoelectric conversion to output an image signal, and a focal point detection pixel;
a calculation section to calculate a focal point adjustment signal, based on an output of the focal point detection pixel;
a camera-shake preventing section which moves the image sensor in a direction perpendicular to an optical axis of the photographic optical system to correct camera shake and also outputs information of the movement of the image sensor; and a correction section to correct the focal point adjustment signal, based on the correction value output by the memory, the information output by the camera-shake preventing section of the movement, and a position of the focal point detection pixel, wherein the correction value is information indicating a ratio of an image plane movement amount at the image height position with respect to a unit image plane movement amount on the optical axis of the photographic optical system, and the correction section corrects the focal point adjustment signal, based on the correction value corresponding to the image height position of the focal point detection pixel and the information output by the camera-shake preventing section of the movement of the image sensor.

5. A camera system comprising an interchangeable lens having a photographic optical system and a camera main body in which the interchangeable is be mounted, the interchangeable lens including:
a memory to store a correction value for focal point adjustment, depending on an image height position of an imaging region in an image sensor and to output the correction value to the camera main body; and a camera-shake preventing section which moves a part of the photographic optical system in a direction perpendicular to an optical axis to correct camera shake and also outputs information of the movement of the part of the photographic optical system, and the camera main body including:
an image sensor having an imaging pixel which receives a light flux having passed through the photographic optical system and performs photoelectric conversion to output an image signal, and a focal point detection pixel;

a calculation section to calculate a focal point adjustment signal, based on an output of the focal point detection pixel; and a correction section to correct the focal point adjustment signal, based on the correction value output by the memory, the information output by the camera-shake preventing section of the movement, and a position of the focal point detection pixel, wherein the correction value is information indicating a ratio of an image plane movement amount at the image height position with respect to a unit image plane movement amount on the optical axis of the photographic optical system, and the correction section corrects the focal point adjustment signal, based on the correction value corresponding to the image height position of the focal point detection pixel and the information output by the camera-shake preventing section of the movement of the part of the photographic optical system.

6. A focal point adjustment method of an imaging device including an image sensor having an imaging pixel which receives a light flux having passed through a photographic lens and performs photoelectric conversion to output an image signal, and a focal point detection pixel, and a camera-shake preventing section which moves the image sensor in a direction perpendicular to an optical axis of the photographic lens to correct camera shake and also outputs information of the movement of the image sensor, the focal point adjustment method comprising:

setting a focal point detection region for the image sensor;
generating a focal point adjustment signal, based on outputs from a plurality of focal point detection pixels included in the focal point detection region; and
correcting the focal point adjustment signal, based on the information output by the camera-shake preventing section and a position of the focal point detection region, wherein the correction value is information indicating a ratio of an image plane movement amount at the image height position with respect to a unit image plane movement amount on the optical axis of the photographic lens, and the focal point adjustment signal is corrected, based on the correction value corresponding to the image height position of the focal point detection pixel and the information output by the camera-shake preventing section of the movement of the image sensor.

7. A focal point adjustment method of an imaging device including an image sensor having an imaging pixel which receives a light flux having passed through a photographic lens and performs photoelectric conversion to output an image signal, and a focal point detection pixel, and a camera-shake preventing section which moves a lens section included in the photographic lens in a direction perpendicular to an optical axis of the photographic lens to correct camera shake and also outputs information of the movement of the lens section, the focal point adjustment method comprising:

setting a focal point detection region for the image sensor,
generating a focal point adjustment signal, based on outputs from a plurality of focal point detection pixels included in the focal point detection region: and
correcting the focal point adjustment signal, based on the information output by the camera-shake preventing section and a position of the focal point detection region, wherein the correction value is information indicating a ratio of an image plane movement amount at the image height position with respect to a unit image plane movement amount on the optical axis of the photographic lens, and the focal point adjustment signal is corrected, based on the correction value corresponding to the image height position of the focal point detection pixel and the information output by the camera-shake preventing section of the movement of the lens section.

* * * * *